(12) United States Patent
Hara et al.

(10) Patent No.: US 7,972,684 B2
(45) Date of Patent: Jul. 5, 2011

(54) TRANSPARENT CONDUCTIVE LAMINATED BODY AND TRANSPARENT TOUCH-SENSITIVE PANEL

(75) Inventors: Hiroshi Hara, Yamaguchi (JP); Haruhiko Itoh, Tokyo (JP); Isao Shiroishi, Tokyo (JP); Hitoshi Mikoshiba, Tokyo (JP)

(73) Assignee: Teijin Limited, Osaka (JP)

( * ) Notice: Subject to any disclaimer, the term of this patent is extended or adjusted under 35 U.S.C. 154(b) by 1102 days.

(21) Appl. No.: 11/660,600

(22) PCT Filed: Aug. 18, 2005

(86) PCT No.: PCT/JP2005/015381
§ 371 (c)(1),
(2), (4) Date: Feb. 20, 2007

(87) PCT Pub. No.: WO2006/019184
PCT Pub. Date: Feb. 23, 2006

(65) Prior Publication Data
US 2007/0224412 A1   Sep. 27, 2007

(30) Foreign Application Priority Data

Aug. 20, 2004 (JP) ................................ 2004-240521
Sep. 30, 2004 (JP) ................................ 2004-286302
Oct. 6, 2004 (JP) ................................ 2004-293417
May 25, 2005 (JP) ................................ 2005-152399

(51) Int. Cl.
*B32B 7/02* (2006.01)

(52) U.S. Cl. ........ 428/212; 428/213; 428/336; 428/323; 428/522; 428/698; 428/702

(58) Field of Classification Search ............. 428/212, 428/213, 336, 323, 522, 689, 698, 702
See application file for complete search history.

(56) References Cited

U.S. PATENT DOCUMENTS
5,225,273 A   7/1993 Mikoshiba et al.

FOREIGN PATENT DOCUMENTS

| | | |
|---|---|---|
| JP | 08-227623 A | 9/1996 |
| JP | 2000-238177 A | 9/2000 |
| JP | 2001-030409 A | 2/2001 |
| JP | 2001-30409 A | 2/2001 |
| JP | 3146059 B2 | 3/2001 |
| JP | 2002-264239 A | 9/2002 |
| JP | 2002-367435 A | 12/2002 |
| JP | 2002-367436 A | 12/2002 |
| JP | 2003-211575 A | 7/2003 |
| JP | 2004-63453 A | 2/2004 |
| JP | 2004-063453 A | 2/2004 |
| JP | 2004-119188 A | 4/2004 |
| JP | 2004-149884 A | 5/2004 |
| JP | 2004-193008 A | 7/2004 |

OTHER PUBLICATIONS

Seiji, et al., JP 2001-030409 (machine translation), Jun. 2, 2001.*
EP Communication, dated Aug. 21, 2009, issued in corresponding EP Application No. 05774822.0, 7 pages.

* cited by examiner

*Primary Examiner* — David R Sample
*Assistant Examiner* — Lawrence D Ferguson
(74) *Attorney, Agent, or Firm* — Sughrue Mion, PLLC

(57) ABSTRACT

A transparent conductive laminated body (1) contains a polymer film having a metallic compound layer and a transparent conductive layer laminated sequentially on at least one surface thereof, (2) the metallic compound layer is in contact with the transparent conductive layer, and (3) the metallic compound layer has a thickness of 0.5 nm or more and less than 10.0 nm.

15 Claims, 5 Drawing Sheets

TRANSPARENT CONDUCTIVE LAMINATED BODY AND TRANSPARENT TOUCH-SENSITIVE PANEL

TECHNICAL FIELD

The present invention relates to a transparent conductive laminated body containing a polymer film having thereon a transparent conductive layer. More specifically, it relates to such a transparent conductive laminated body that contains a polymer film having laminated sequentially thereon a metallic compound layer, and a transparent conductive layer, and that is suitable for a display device and a transparent touch-sensitive panel, and a transparent touch-sensitive panel using the same.

BACKGROUND ART

The recent trends of size reduction, weight saving and energy saving of various kinds of devices under concept of downsizing as a key term provide such a tendency that various display devices and thin film solar cells are featured by using a polymer film as substrates thereof. A polymer film is lightweight and is simultaneously rich in flexibility, and thus can suppress various devices from being broken due to cracking. Accordingly, there is an increasing active trend of applying a polymer film to the fields where glass has been employed.

There has been such an attempt that a functional coating layer is formed on an organic material, such as a polymer film, in order to control the refractive index and to suppress gas permeability. However, a transparent conductive laminated body having a transparent conductive layer formed on the coating layer is insufficient in flexural resistance and is difficult to enjoy flexibility of the polymer film sufficiently. In particular, sufficient flexural resistance cannot be obtained in the case where a transparent conductive layer, which provides low resistance, is formed directly on a polymer film. Accordingly, it has been investigated that various organic layers for improving flexural resistance are provided between a polymer film and a transparent conductive film.

A metallic compound layer is often formed on a polymer film for imparting low moisture permeability like glass. However, when the metallic compound layer has such a thickness that is larger than that to provide a continuous layer, although it has a function as a gas barrier layer, the structure of the metallic compound layer might be broken upon receiving an external stress, due to a large difference in elastic modulus between the polymer film and the metallic compound layer, which provides a difference in elongation. Flexibility is considerably decreased when a layer such as a transparent conductive layer having a thickness of about 0.1 μm, is laminated on a metallic compound layer. The loss on flexibility ascribable to the formation of the functional inorganic layer stands in the way of the transparent conductive laminated body using a polymer film, and applications thereof to various devices are inhibited thereby.

In various devices, on the other hand, a transparent conductive layer is often used as an electrode material, known examples of which include ITO containing indium oxide doped with tin, IZO containing indium oxide doped with zinc, GZO containing zinc oxide doped with gallium, and AZO containing zinc oxide doped with aluminum. Adhesiveness of the transparent conductive layers, which are formed on an organic material layer, is demanded to be improved because the transparent conductive layers might be released from the organic material layer due to an external stress for their insufficient adhesiveness. In particular, flexural resistance is becoming an important issue of the transparent conductive laminated body using a polymer film.

Improving the flexural resistance of the transparent conductive laminated body using a polymer film will make the transparent conductive laminated body unlimited in usage. The function that is naturally expected in the transparent conductive laminated body is to use in a device operated in a flexed state. In the purpose of a touch-sensitive panel, in particular, the improvement in flexural resistance of the transparent conductive laminated body can improve the writing resistance of a transparent touch-sensitive panel using the transparent conductive laminated body.

It has been proposed that an undercoating layer is formed immediately under the transparent conductive layer to improve the flexural resistance of the transparent conductive laminated body (as described in Patent Document 1).

In the case where the undercoating layer is an organic material layer, however, it is difficult to ensure the flexural resistance sufficiently in the transparent conductive laminated body having a transparent conductive layer with a low resistance formed on the organic material layer for applications to devices requiring a particularly low resistance.

In order to solve the problem, such a technique for improving the flexural resistance of the transparent conductive laminated body has been developed that a metallic compound layer having relatively high adhesiveness to an organic material is used as the undercoating layer (as described in Patent Document 2). In this case, however, sufficient flexural resistance cannot be obtained with the constitutions shown in Patent Document 2.

The applicant of the present application has disclosed such a technique that inorganic oxide fine particles having an average primary particle diameter of less than 100 nm are segregated at a surface of a cured resin layer for improving the flexural resistance of the transparent conductive laminated body, and has proposed to add a surfactant for segregating the inorganic oxide fine particles at the surface of the cured resin layer (as described in Patent Document 3).

In the case where a surfactant is added, however, it has been confirmed that the surfactant is not fixed within the cured resin layer but is exuded to the surface to cause transfer, which brings about contamination of the transparent conductive laminated body and the like.

[Patent Document 1] JP-A-8-227623
[Patent Document 2] Japanese Patent No. 3146059
[Patent Document 3] JP-A-2004-119188

DISCLOSURE OF THE INVENTION

An object of the invention is to solve the problems associated with the conventional techniques and to improve a transparent conductive laminated body using a polymer film in flexural resistance.

BEST MODE FOR CARRYING OUT THE INVENTION

Figure 1:
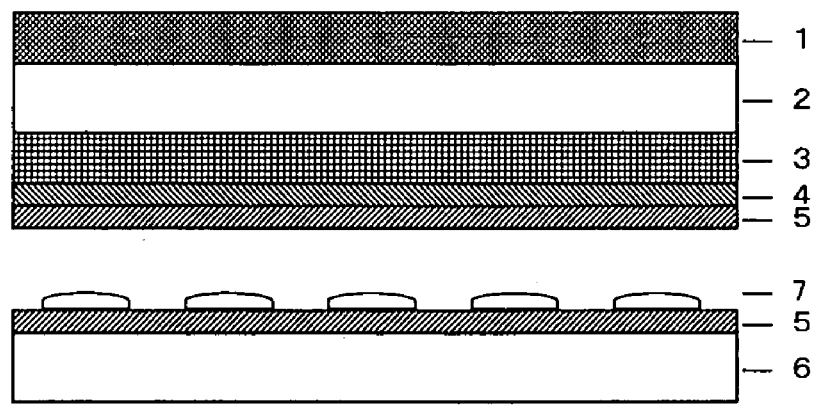
FIG. 1 is a diagram schematically showing a constitution of touch-sensitive panels produced in Examples 5 and 6 and Comparative Examples 6 and 7.

The invention will be described below in detail

Polymer Film

The polymer film constituting the transparent conductive laminated body of the invention is not particularly limited as far as it is formed of a transparent polymer excellent in heat resistance, and examples thereof include a polyester resin, such as polyethylene terephthalate, polyethylene-2,6-naphthalate and polydiallyl phthalate, a polycarbonate resin, a polyether sulfone resin, a polysulfone resin, a polyarylate resin, an acrylate resin, a cellulose acetate resin and a cycloolefin polymer. These may be used as a homopolymer or a copolymer, and may be used solely or as a mixture. It is preferred to mix plural kinds of polymers for obtaining a novel function in addition to transparency and rigidity.

The polymer film may be favorably produced by a melt extruding method, a solution casting method and the like, which have been generally used, and depending on necessity, the polymer film thus formed may be preferably subjected to unidirectional stretching or bidirectional stretching for improving the mechanical strength and for improving the optical function. The polymer film may be produced by a multilayer co-extruding method.

In the case where the transparent conductive laminated body of the invention is used as a substrate of a display device, such as a liquid crystal display device, aromatic polycarbonate having a bisphenol component, which is excellent in transparency, is preferably used. The production method of aromatic polycarbonate is not particularly limited, such a film is excellent in transparency, optical isotropy and the like that is produced by polymerizing by a phosgene method and molded by a solution casting method. Examples of the bisphenol component include 2,2-bis(4-hydroxyphenyl)propane (bisphenol A), 1,1-bis(4-hydroxyphenyl)cyclohexane (bisphenol Z), 1,1-bis(4-hydroxyphenyl)-3,3,5-trimethylcyclohexane, 9,9-bis(4-hydroxyphenyl)fluorene and 9,9-bis(3-methyl-4-hydroxyphenyl)fluorene. These may be used in combination of two or more of them. In other words, the aromatic polycarbonate may be any of polycarbonate obtained by polymerizing one kind of a bisphenol component, polycarbonate obtained by copolymerizing two or more kinds of bisphenol components, and a blend of two or more kinds of polycarbonate different from each other in bisphenol component.

The polymer preferably has a high glass transition point, which is an index of operating temperature, and the glass transition point of the polymer film is preferably 150° C. or more.

For example, aromatic polycarbonate of a bisphenol A type (which uses bisphenol A as a bisphenol component) has a glass transition point of 150° C. Aromatic polycarbonate obtained by copolymerizing 9,9-bis(4-hydroxyphenyl)fluorene or 9,9-bis(3-methyl-4-hydroxyphenyl)fluorene with bisphenol A has a glass transition point of about 200° C. while it depends on the copolymerization composition. In consideration of moldability, transparency, economy and the like, the copolymerization ratio of bisphenol A is preferably from 20 to 70% by mol. The polymer film having a high glass transition point and optical isotropy is suitable for a liquid crystal display device, an organic electroluminescent diode and electronic paper owing to the stability to the thermal history in the production process of these devices.

Polyethylene terephthalate and polyethylene-2,6-naphthalate as the polymer film are advantageous in high rigidity, high versatility and low cost. These films can attain an operating temperature higher than the glass transition point by applying biaxial stretching and thermal fixation through a sequential method or a simultaneous method. An ordinary biaxially stretched polyethylene terephthalate film has an operating temperature of about 150° C., and an ordinary biaxially stretched polyethylene-2,6-naphthalate film has an operating temperature of about 180° C.

The thickness of the polymer film is preferably from 0.01 to 0.4 mm, and is more preferably about from 0.1 to 0.2 mm for such a purpose as electronic paper. Such a constitution may also be employed that a polymer film having a thickness of about 0.01 mm is adhered with another polymer film having a thickness of 0.01 mm or more.

In the case where the transparent conductive laminated body of the invention is used as a movable electrode substrate of a touch-sensitive panel, the thickness of the polymer film is preferably from 0.075 to 0.400 mm from the standpoint of maintaining flexibility and flatness for operating the touch-sensitive panel as a switch. Such a constitution may also be employed that a polymer film having a thickness of less than 0.4 mm is adhered with another polymer film through an adhesive. In the case where the transparent conductive laminated body of the invention is used as a fixed electrode substrate of a touch-sensitive panel, the thickness of the polymer film is preferably from 0.4 to 4.0 mm from the standpoint of strength for maintaining flatness, and such a constitution may also be employed that a polymer film having a thickness of from 0.050 to 0.400 mm is adhered with another sheet or glass substrate to make a total thickness of from 0.4 to 4.0 mm.

In recent years, furthermore, such a novel touch-sensitive panel is being developed that a polarizing plate or a combination of a polarizing plate and a phase retardation film is laminated on the input side (operator side) of the touch-sensitive panel. The constitution has such an advantage that the reflection coefficient of external light inside the touch-sensitive panel is decreased to half or less through the optical effect of the polarizing plate or the combination of a polarizing plate and a phase retardation film, whereby the display is improved in contrast in a state where the touch-sensitive panel is installed.

In a touch-sensitive panel of this type, a polymer film excellent in optical isotropy or a polymer film having a particular phase difference, such as $\lambda/4$ or $\lambda/2$, is preferably used since polarized light is transmitted through the transparent conductive laminated body. In the former case, the in-plane retardation value Re, which is expressed by the equation Re=$(nx-ny) \times d$ (nm), wherein nx represents the refractive index of the polymer film in the direction of the retarded phase axis, ny represents the refractive index thereof in the direction of the progressive phase axis, and d (nm) represents the thickness of the substrate, of the polymer film is preferably 30 nm or less, and more preferably 20 nm or less. In the later case, the polymer film can also function as a phase retardation film. The in-plane retardation value Re is represented by a value measured at a wavelength of 590 nm by using a spectral ellipsometer (M-150, produced by JASCO Corp.).

As having been described, the in-plane retardation value of the polymer film is significantly important in the purpose of a touch-sensitive panel where polarized light is passed through the transparent conductive laminated body, and in addition to this, the three-dimensional refractive index characteristic value of the polymer film, i.e., K value represented by the equation K=$\{(nx+ny)/2-nz\} \times d$, wherein nx and ny represent the in-plane vertical and transversal refractive indexes of the polymer film, respectively, and nz represents the refractive index thereof in the thickness direction, is preferably from −250 to +150 nm, and more preferably in a range of from −200 to +100 nm for obtaining excellent view angle characteristics of the tough-sensitive panel.

Examples of the polymer film exhibiting excellent optical isotropy include a molded substrate of polycarbonate, amorphous polyarylate, polyether sulfone, polysulfone, triacetyl cellulose, diacetyl cellulose, a cycloolefin polymer, and modified products thereof and copolymers thereof with another material, a molded substrate of a thermosetting resin, such as an epoxy resin, and a molded substrate of an ultraviolet ray-curable resin, such as an acrylate resin. From the standpoint of moldability, production cost and thermal stability, most preferred examples thereof include a molded substrate of polycarbonate, amorphous polyarylate, polyether sulfone, polysulfone, a cycloolefin polymer, and modified products thereof and copolymers thereof with another material.

More specifically, examples of the polycarbonate include polycarbonate obtained by polymerizing (copolymerizing) by using at least one component selected from the group consisting of bisphenol A, 1,1-di(4-phenol)cyclohexylidene, 3,3,5-trimethyl-1,1-di(4-phenol)cyclohexylidene, fluorene-9,9-di(4-phenol), fluorene-9,9-di(3-methyl-4-phenol) and the like, and a blend of polycarbonate obtained by polymerizing at least one component selected from the aforementioned group, and a film of polycarbonate having an average molecular weight in a range of from 15,000 to 100,000 (commercial examples of which include Panlite, produced by Teijin Ltd., and Apec HT, produced by Bayer AG) is preferably used.

Commercial examples of the amorphous polyarylate include Elmech, produced by Kaneka Corp., U-Polymer, produced by Unitika Ltd., and Isaryl, produced by Isonova Corp. Commercial examples of the cycloolefin polymer include Zeonor, produced by Zeon Corp., and Arton, produced by JSR Crop.

Examples of the molding method of the polymer film include a melt extrusion method, a solution casting method and an injection molding method, and the polymer film is preferably molded by using a melt extrusion method or a solution casting method from the standpoint of obtaining excellent optical isotropy.

In the case where the transparent conductive laminated body of the invention is not used with a polarizing plate, the retardation value Re may be any value as far as transparency is ensured.

Metallic Compound Layer

It is necessary in the invention that a metallic compound layer is laminated on at least one surface of the polymer film, and in particular, it is important for improving the flexural resistance of the transparent conductive laminated body that the metallic compound layer is formed to have a thickness in a range of 0.5 nm or more and less than 10.0 nm.

In the case where the thickness is 10.0 nm or more, the metallic compound layer starts to exhibit a mechanical property as a continuous body, whereby no significant effect on improvement in flexural resistance is obtained. In the case where the thickness is less than 0.5 nm, on the other hand, the thickness is difficult to control, and furthermore, no anchoring effect is obtained with the polymer film or a cured resin layer described later, whereby no sufficient effect on improvement in flexural resistance. The thickness is more preferably in a range of from 1.0 to 5.0 nm.

Examples of the metallic compound constituting the layer include an oxide, a nitride and an oxynitride of at least one metal selected from the group consisting of silicon, aluminum, titanium, magnesium, zinc, zirconium, indium and tin, and a mixture thereof, and specific examples of the metallic oxide include silicon oxide, aluminum oxide, titanium oxide, magnesium oxide, zinc oxide, zirconium oxide, indium oxide and tin oxide. In particular, silicon oxide is preferably used.

Examples of the oxynitride include silicon oxynitride ($SiO_xN_y$) and aluminum oxynitride ($AlO_xN_y$), and examples of the nitride include silicon nitride, aluminum nitride, zinc nitride and zirconium nitride.

The metallic compound layer can be formed by a known method, and for example, such a physical method (physical vapor deposition method, which is abbreviated as PVD) may be used as a DC magnetron sputtering method, an RF magnetron sputtering method, an ion plating method, a vapor deposition method, a pulse laser deposition method and a physical method (PVD) combining them. In consideration of industrial production for forming the metallic compound layer having a uniform thickness on a large area, a DC magnetron sputtering method is preferably used. In addition to the aforementioned physical methods (PVD), such a chemical method (chemical vapor deposition method, CVD) may be used as a plasma CVD method and a sol-gel method. From the standpoint of controlling the thickness, the sputtering methods are preferred.

As a target used for sputtering, a metallic target is preferably used, and a reactive sputtering method is widely used because an oxide, a nitride or an oxynitride of an element, which are used as the metallic compound layer, is an insulating body and cannot be applied as an oxide, nitride or oxynitride target to a DC magnetron sputtering method. In recent years, such an electric power source is being developed that two cathodes are simultaneously discharged to suppress an insulating body from being formed on the target, whereby the pseudo-RF magnetron sputtering method is being applied.

In the invention, in the case where the metallic compound layer is formed by a DC magnetron sputtering method using a metallic target, it can be produced by such a production method that the pressure (back pressure) of a vacuum chamber for forming the metallic compound layer is once made to be $1.3 \times 10^{-4}$ Pa or less, and then a reactive gas, such as an inert gas and oxygen, is introduced thereto. It is preferred that the pressure in the vacuum chamber for forming the metallic compound layer is once made to be $1.3 \times 10^{-4}$ Pa or less, whereby molecular species, which might remain in the vacuum chamber and adversely affect the formation process of the metallic compound layer, can be suppressed from adversely affecting. The pressure is more preferably $5 \times 10^{-5}$ Pa or less, and further preferably $2 \times 10^{-5}$ Pa or less.

Examples of the inert gas subsequently introduced include He, Ne, Ar, Kr and Xe, and it has been said that an inert gas having a larger atomic weight causes less damage on the film to improve the surface flatness. However, Ar is preferably used from the standpoint of cost. The inert gas may be used with a reactive gas, such as oxygen, to which $O_3$, $N_2$, $N_2O$, $H_2O$ and $NH_3$ and the like may be added depending on purposes.

In the invention, the metallic compound layer may be produced by such a production method that the partial pressure of water in the vacuum chamber for forming the metallic compound layer is $1.3 \times 10^{-4}$ Pa or less, and then an inert gas and a reactive gas, such as oxygen, are introduced. The partial pressure of water is more preferably $4 \times 10^{-5}$ Pa or less, and further preferably $2 \times 10^{-5}$ Pa or less.

In order to reduce the internal stress of the metallic compound layer by introducing hydrogen into the metallic compound layer, water may be intentionally introduced in a range of from $1.3\times10^{-4}$ to $3\times10^{-2}$ Pa. The adjustment may be carried out in such a manner that after once producing vacuum, water is introduced by using a variable leak valve or mass flow controller. It may be also carried out by controlling the back pressure of the vacuum chamber.

Upon determining the water partial pressure in the invention, an in-process monitor of a differential pumping type may be used. In alternative, a quadrupole mass spectrometer having a wide dynamic range and being capable of measuring under a pressure of an order of 0.1 Pa or less may be used. In general, under a vacuum degree of about $1.3\times10^{-5}$ Pa, the pressure is constituted by water. Therefore, the value measured by a vacuum gauge may be considered as the water partial pressure as it is.

In the invention, the polymer film is used as a substrate, and therefore, the temperature of the substrate cannot be increased over the softening point temperature of the polymer film. Accordingly, the substrate temperature upon forming the metallic compound layer is necessarily equal to or lower than the softening point temperature of the polymer film. In the case of polyethylene terephthalate, which is a representative example of the polymer film, it is preferred that the transparent conductive layer is formed while the substrate temperature is maintained at 80° C. or less with no special treatment. The substrate temperature is more preferably maintained at 50° C. or less, and further preferably 20° C. or less. Even on the polymer film having a high glass transition point, the substrate temperature is preferably 80° C. or less, more preferably 50° C. or less, and further preferably 20° C. or less, from the standpoint of controlling outgas.

In the invention, the metallic compound layer is in contact with the transparent conductive layer described later, and it is preferred that the thickness of the metallic compound layer is smaller than the thickness of the transparent conductive layer. According to the constitution, the transparent conductive laminated body is improved in flexural resistance, and as a result, a transparent touch-sensitive panel using the transparent conductive laminated body is improved in writing resistance.

Transparent Conductive Layer

In the invention, the transparent conductive layer formed adjacent to the metallic compound layer can be formed by using an oxide of at least one metal selected from the group consisting of indium, tin, zinc, gallium and aluminum. In particular, ITO obtained by adding tin oxide to indium oxide, IZO obtained by adding zinc oxide to indium oxide, GZO obtained by adding gallium oxide to zinc oxide, and AZO obtained by adding aluminum oxide to zinc oxide are preferred. In the case of ITO, in particular, ITO containing from 2 to 20% by weight of tin oxide is preferred for the polymer film substrate. ITO containing from 2 to 15% by weight of tin oxide is more preferred, and ITO containing from 3 to 10% by weight of tin oxide is further preferred. In the case of an IZO film, an IZO film containing from 5 to 20% by weight of zinc oxide is preferred for the polymer film substrate. An IZO film containing from 5 to 10% by weight of zinc oxide is more preferred.

The transparent conductive layer of the invention can be formed by a PVD method, such as a DC magnetron sputtering method, an RF magnetron sputtering method, an ion plating method and an ion beam sputtering method, and a CVD method, and in consideration of forming the uniform transparent conductive layer on a large area, a DC magnetron sputtering method is preferably used.

In the DC magnetron sputtering method, an oxide sintered target containing indium oxide added with from 2 to 20% by weight of tin oxide, and an oxide sintered target containing indium oxide added with from 2 to 20% by weight of zinc oxide are preferably used. In alternative, the transparent conductive layer may be formed by a reactive sputtering method using an alloy target obtained by adding metallic tin or metallic zinc to metallic indium.

In the case where the transparent conductive layer is formed by the DC magnetron sputtering method using the oxide sintered target, the pressure (back pressure) in a vacuum chamber is once made to be $1.3\times10^{-4}$ Pa or less, and then an inert gas and oxygen is introduced thereto. It is preferred that the pressure in the vacuum chamber is once made to be $1.3\times10^{-4}$ Pa or less, whereby molecular species, which might remain in the vacuum chamber and adversely affect the formation process of the transparent conductive layer, can be suppressed from adversely affecting. The pressure is more preferably $5\times10^{-5}$ Pa or less, and further preferably $2\times10^{-5}$ Pa or less.

Examples of the inert gas subsequently introduced include He, Ne, Ar, Kr and Xe, and it has been said that an inert gas having a larger atomic weight causes less damage on the film to improve the surface flatness. However, Ar is preferably used from the standpoint of cost. The inert gas may be added with oxygen in an amount in the order of from $1.3\times10^{-4}$ to $7\times10^{-2}$ Pa in terms of partial pressure for adjusting the oxygen concentration entrained into the transparent conductive layer. Furthermore, in addition to oxygen, $O_3$, $N_2$, $N_2O$, $H_2O$, $NH_3$ and the like may be used depending on purposes.

In the invention, in order to adjust the resistance of the transparent conductive layer, water may be intentionally introduced in a range of from $1.3\times10^{-4}$ to $3\times10^{-2}$ Pa. The adjustment may be carried out in such a manner that after once evacuating the vacuum chamber, water is introduced by using a variable leak valve or mass flow controller. It may be also carried out by controlling the back pressure of the vacuum chamber.

Upon determining the water partial pressure in the invention, an in-process monitor of a differential pumping type may be used. In alternative, a quadrupole mass spectrometer having a wide dynamic range and being capable of measuring under a pressure of an order of 0.1 Pa or less may be used. In general, under a vacuum degree of about $1.3\times10^{-5}$ Pa, the pressure is constituted by water. Therefore, the value measured by a vacuum gauge may be considered as the water partial pressure as it is.

In the invention, the temperature of the substrate cannot be increased over the softening point temperature of the polymer film. Accordingly, the polymer film upon forming the transparent conductive layer is necessarily at about room temperature (20° C.) or less to the softening point temperature of the polymer film or less. In the case where a polycarbonate film is used as the polymer film, for example, the glass transition point thereof is 150° C., but it is preferred that the transparent conductive layer is formed while the substrate temperature is maintained at 80° C. or less from the standpoint of controlling outgas from the polymer film. The film temperature is more preferably maintained at 50° C. or less, and further preferably 20° C. or less. Even in the case where the polymer film has a higher glass transition point, the transparent conductive layer is preferably formed at a temperature of 80° C. or less, more preferably 50° C. or less, and further preferably 20° C. or less, from the standpoint of controlling outgas from the polymer film.

In the transparent conductive laminated body of the invention, the thickness of the transparent conductive layer may be about from 5.0 to 260 nm from the standpoint of color tone and light transmittance. In the case where the thickness is less than 5.0 nm, the resistance far exceeds 1,000 Ω/sq. to lose devices, to which the transparent conductive laminated body can be applied. In the case where the thickness exceeds 260 nm, the light transmittance is decreased, and furthermore, the flexural resistance is deteriorated due to stress occurring in the transparent conductive layer.

The thickness of the transparent conductive layer is preferably selected appropriately depending on the purpose, and in the case where the resulting transparent conductive laminated body is to be applied to a transparent touch-sensitive panel, for example, the thickness of the transparent conductive laminated body is preferably from 5.0 to 50.0 nm.

The transparent conductive layer in the invention may be any state of a crystalline state, an amorphous state, and a mixture of a crystalline state and an amorphous state. In the case where the transparent conductive laminated body is applied to various display devices, it suffers a high temperature near 200° C. in the process, and in the case where such a high process temperature is used, IZO, which maintains an amorphous state at about 350° C., is preferred as the transparent conductive layer.

In the application to a transparent touch-sensitive panel, a crystalline material containing indium oxide as a major component is preferably used as the transparent conductive layer, and a crystalline ITO film is particularly preferably used. The crystalline grain diameter of the ITO layer is preferably 3,000 nm or less from the standpoint of writing resistance. The crystalline grain diameter referred herein is defined as the maximum value among diagonal lines or diameters of polygonal or elliptical regions of crystalline grains observed under a transmission electron microscope (TEM). The language "containing indium-oxide as a major component" means indium oxide containing tin, tellurium, cadmium, molybdenum, tungsten, fluorine, zinc or the like as a dopant, and indium oxide further containing silicon, titanium, zinc or the like as a dopant, in addition to tin or the like.

The "crystalline layer" means that 50% or more, preferably 75% or more, more preferably 95% or more, and particularly preferably 99.9% or more, of the layer formed of indium oxide containing a dopant is occupied by a crystalline phase.

Cured Resin Layer

In the invention, a cured resin layer is preferably further provided between the polymer film and the metallic compound layer. By disposing the cured resin layer, the flexural resistance of the resulting transparent conductor can be further improved, and in particular, a transparent touch-sensitive panel using the transparent conductive laminated body is further improved in writing resistance and edge writing resistance.

Examples of a resin for forming the cured resin layer include an ionizing radiation curing resin and a thermosetting resin.

Examples of the ionizing radiation curing resin include monofunctional or polyfunctional acrylate, such as polyol acrylate, polyester acrylate, urethane acrylate, epoxy acrylate, modified styrene acrylate, melamine acrylate and silicon-containing acrylate.

Specific examples of the acrylate include polyfunctional acrylate, such as trimethylolpropane trimethacrylate, trimethylolpropane ethylene oxide-modified acrylate, trimethylolpropane propylene oxide-modified acrylate, pentaerythritol triacrylate, dipentaerythritol hexaacrylate, dimethyloltricyclodecane diacrylate, tripropylene glycol triacrylate, diethylene glycol diacrylate, 1,6-hexanediol diacrylate, epoxy-modified acrylate, urethane-modified acrylate and epoxy-modified acrylate. These types of acrylate may be used solely or in combination of several kinds of them. In some cases, a hydrolysate of various kinds of alkoxysilane may be added in an appropriate amount. In the case where the resin layer is polymerized with an ionizing radiation, a known photopolymerization initiator is added in an appropriate amount. A photosensitizer may also be added in an appropriate amount depending on necessity.

Examples of the photopolymerization initiator include acetophenone, benzophenone, benzoin, benzoyl benzoate and a thioxanthone compound, and examples of the photosensitizer include triethylamine and tri-n-butyl phosphine.

Examples of the thermosetting resin include an organosilane thermosetting resin containing such a silane compound as a monomer as methyltriethoxysilane and phenyltriethoxysilane, a melamine thermosetting resin containing etherified methylolmelamine or the like as a monomer, an isocyanate thermosetting resin, a phenol thermosetting resin and an epoxy thermosetting resin. These thermosetting resins may be used solely or in combination of plural kinds of them. A thermoplastic resin may be mixed therewith depending on necessity. In the case where the resin layer is crosslinked with heat, a known reaction accelerator or a known curing agent is added in an appropriate amount.

Examples of the reaction accelerator include triethylene diamine, dibutyl tin laurate, benzylmethylamine and pyridine. Examples of the curing agent include methylhexahydrophthalic anhydride, 4,4'-diaminodiphenylmethane, 4,4'-diamino-3,3'-diethyldiphenylmethane and diamindiphenylsulfone.

Examples of the method for forming the cured resin layer include a method where a coating composition obtained by dissolving the ionizing radiation curing resin, the thermosetting resin and the various additives in an organic solvent, followed by adjusting concentration and viscosity, is coated on the polymer film to form a coated layer, which is then cured by treating with an ionizing radiation or heat.

Examples of the coating method for forming the coated layer include a method using a known coating machine, such as a doctor knife, a bar coater, a gravure roll coater, a curtain coater, a knife coater and a spin coater, a spraying method, and a dipping method.

Examples of the organic solvent for preparing the coating composition include an alcohol solvent and a hydrocarbon solvent, such as ethanol, isopropyl alcohol, butanol, 1-methoxy-2-propanol, hexane, cyclohexane and ligroin. In addition to these, such a polar solvent may be used as cyclohexanone, butyl acetate and isobutyl acetate. These may be used solely or as a mixed solvent of two or more of them.

The thickness of the cured resin layer is preferably 10 μm or less. It is more preferably 5 μm or less, and further preferably from 1 to 3 μm. There is no necessity of providing a lower limit in the thickness of the cured resin layer, but in the case where an ionizing radiation curing resin is used, it is difficult to cure a film of a thickness of 0.05 μm or less. In the case where the thickness of the cured resin layer exceeds 10 μm, on the other hand, the mechanical characteristics exhibited by the cured resin layer occupies a large proportion in the transparent conductive laminated body to cause warpage in the transparent conductive laminated body and to make the cured resin layer brittle, whereby the effect of improving the flexural resistance is impaired.

It is preferred in the invention that the cured resin layer and the metallic compound layer contain the same kind of metallic atoms. A transparent touch-sensitive panel using the transparent conductive laminated body formed by laminating the cured resin layer containing the same metallic atoms as the metallic compound layer, the metallic compound layer and the transparent conductive layer is particularly excellent in writing resistance and edge writing resistance, and thus it is expected that the adhesion property between the cured resin layer and the metallic compound layer is improved by using the cured resin layer containing the same metallic atoms as the metallic compound layer.

Examples of the method of forming the cured resin layer containing the same metallic atoms as the metallic compound layer include a method, in which the cured resin layer is formed by using a resin obtained by hydrolysis and polycondensation of a metallic alkoxide, a method, in which the cured resin layer is formed by using an ionizing radiation curing resin or a thermosetting resin containing a metallic alkoxide component, and a method, in which metallic compound ultrafine particles are added to the cured resin layer formed of an ionizing radiation curing resin or a thermosetting resin.

In the case where the cured resin layer is formed by using a resin obtained by hydrolysis and polycondensation of a metallic alkoxide, and the case where the cured resin layer is formed by using an ionizing radiation curing resin or a thermosetting resin containing a metallic alkoxide component, examples of the metallic alkoxide include an organosilane thermosetting resin (alkoxysilane), titanium alkoxide and zirconium alkoxide.

Examples of the alkoxysilane include phenyltriethoxysilane, tetramethoxysilane, tetraethoxysilane, methyltrimethoxysilane, methyltrietoxysilane, dimethyldimethoxysilane, γ-glycidoxypropyltrimethoxysilane, β-(3,4-epoxycyclohexyl)ethyltriethoxysilane, vinyltrimethoxysilane, N-β-(aminoethyl)-γ-aminopropyltrimethoxysilane, N-β-(aminoethyl)-γ-aminopropyldimethoxysilane and γ-aminopropyltriethoxysilane.

These kinds of alkoxysilane are preferably used as a mixture of two or more kinds of them from the standpoint of mechanical strength, adhesiveness and solvent resistance of the layer, and an alkoxysilane containing an amino group in the molecule thereof is preferably contained in the total composition of the alkoxysilane in a weight ratio of from 0.5 to 40%.

Examples of the titanium alkoxide include titanium tetraisopropoxide, tetra-n-propylorthotitanate, titanium tetra-n-butoxide and tetrakis(2-ethylhexyloxy) titanate.

Examples of the zirconium alkoxide include zirconium tetraisopropoxide and zirconium tetra-n-butoxide.

The metallic alkoxide may be used in the form of a monomer or in the form of a state that is suitably oligomerized in advance through hydrolysis and polycondensation.

In the case where cured resin layer is formed by using a resin obtained by hydrolysis and polycondensation of a metallic alkoxide, a coating composition obtained by dissolving and diluting the monomer or oligomer of a metallic alkoxide in a suitable organic solvent, followed by adjusting viscosity and concentration, is generally coated on the polymer film to form a coated layer, which is then heat treated. In the coated layer, hydrolysis and polycondensation proceed through moisture in the air and heat.

In general, a suitable heat treatment is necessary for accelerating polycondensation of a metallic alkoxide, and it is preferred to conduct a heat treatment at a temperature of 100° C. or more for several minutes or more in the coating process. In alternative, the coated layer may be irradiated with an ionizing radiation parallel to the heat treatment.

Examples of the diluting solvent for preparing the coating composition include an alcohol solvent and a hydrocarbon solvent, such as ethanol, isopropyl alcohol, butanol, 1-methoxy-2-propanol, hexane, cyclohexane and ligroin. In addition to these, such a polar solvent may be used as xylene, toluene, cyclohexanone, methyl isobutyl ketone, and isobutyl acetate. These may be used solely or as a mixed solvent of two or more of them.

Examples of the coating method for forming the coated layer include a method using a known coating machine, such as a doctor knife, a bar coater, a gravure roll coater, a curtain coater, a knife coater and a spin coater, a spraying method, and a dipping method.

In the case where metallic compound ultrafine particles are added to the cured resin layer formed of an ionizing radiation curing resin or a thermosetting resin, it is preferred that ultrafine particles C having an average primary particle diameter of 100 nm or less formed of a metallic oxide or a metallic fluoride are added to the cured resin layer. The ultrafine particles C may be a sole kind of the ultrafine particles C or may be a combination of plural kinds of the ultrafine particles C.

The average primary particle diameter of the ultrafine particles C is preferably 100 nm or less, and more preferably 50 nm or less. By controlling the average primary particle diameter of the ultrafine particles C to 100 nm or less, the cured resin layer can be suppressed from being whitened or hazy.

Examples of the ultrafine particles C include ultrafine particles of a metallic oxide and a metallic fluoride, such as $Bi_2O_3$, $CeO_2$, $In_2O_3$, $(In_2O_3 \cdot SnO_2)$, $HfO_2$, $La_2O_3$, $MgF_2$, $Sb_2O_5$, $(Sb_2O_5 \cdot SnO_2)$, $SiO_2$, $SnO_2$, $TiO_2$, $Y_2O_3$, $ZnO$ and $ZrO_2$, and in particular, silicon oxide is preferably used.

The amount of the ultrafine particles C, when they are added, is from 1 to 400 parts by weight, preferably from 1 to 300 parts by weight, and more preferably from 1 to 250 parts by weight, per 100 parts by weight of the cured resin layer. In the case where the amount of the ultrafine particles C exceeds 400 parts by weight, there are some cases where the film strength and the adhesiveness are insufficient.

In the case where the metallic compound ultrafine particles C and an organic compound containing silicon atoms are added to the cured resin layer, the ultrafine particles C can be in such a state that the ultrafine particles C are segregated at the surface of the cured resin layer.

Examples of the organic compound containing silicon atoms include an ordinary surfactant containing silicon atoms and an ordinary ionizing radiation curing or thermosetting resin component containing silicon atoms. Preferred examples thereof include an ordinary ionizing radiation curing resin component containing silicon atoms and an ordinary thermosetting resin component containing silicon atoms. In the case where the organic compound containing silicon atoms is not an ordinary ionizing radiation curing resin component and an ordinary thermosetting resin component, it is not preferred since there is such a possibility that the organic compound containing silicon atoms is not fixed within the cured resin layer, and thus it is exuded to the surface and transferred to contaminate surrounding materials and devices.

In the case where both the surface of the movable electrode substrate and the surface of the fixed electrode substrate are flat, there are cases where a Newton ring is observed, which is caused by interference between reflected light from the surface of the movable electrode substrate and reflected light from the surface of the fixed electrode substrate. The surface of the cured resin layer may be roughened, for preventing the Newton ring by optically scattering the reflected light. Examples of the method for roughening the surface of the cured resin layer include a method of adding fine particles A having an average primary particle diameter of from 0.001 to 5 μm solely, or a combination of two or more kinds of the fine particles A having different average primary particle diameters, to the cured resin layer. The roughness of the surface of the cured resin layer obtained by the aforementioned roughening method is preferably a ten-point average roughness (Rz) defined by JIS B0601 1994 of from 100.0 to 450.0 nm and a haze defined by JIS B7361 of 5% or less.

The refractive index at 550 nm of the cured resin layer used in the invention preferably provides a difference in refractive index with respect to the refractive index at 550 nm of the polymer film of less than 0.05, and more preferably less than 0.02. In the case where the difference in refractive index between the cured resin layer and the polymer film is less than 0.05, a Moire pattern due to unevenness in thickness of the cured resin layer can be suppressed. In the case where the difference in refractive index at 550 nm between the cured resin layer and the polymer film is 0.05 or more, a Moire pattern due to unevenness in thickness of the cured resin layer occurs to deteriorate considerably the appearance of the transparent conductive laminated body.

It has been generally known that the refractive index at 550 nm of the cured resin layer is lower than the refractive index at 550 nm of the polymer film. In order to make the difference in refractive index at 550 nm between the polymer film and the cured resin layer to be less than 0.05, it is necessary to increase the refractive index at 550 nm of the cured resin layer.

It is preferred to employ such a method that a cured resin component having a higher refractive index at 550 nm than the polymer film and a cured resin component having a lower refractive index at 550 nm than the polymer film are used, and the refractive index of the cured resin layer is controlled by changing the mixing ratio of them. In alternative, such a method may be preferably employed that a cured resin component having a molecular skeleton that is similar to the molecular skeleton used in the polymer film is added to make the refractive index of the cured resin layer close to that of the polymer film. In this method, the cured resin layer has a wavelength dependency of refractive index similar to that of the polymer film, whereby the difference in refractive index can be decreased over a wide wavelength range.

Examples of the cured resin component having a high refractive index at 550 nm include an acrylate resin having a cardo skeleton (skeleton having cyclic groups) represented by the following formula (a):

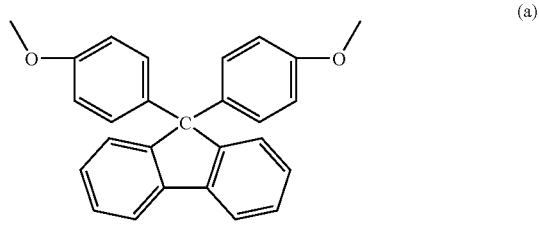

(a)

For example, in the case where polycarbonate having a fluorene skeleton is used as the polymer film, an acrylate resin having a fluorene skeleton represented by the formula (b) described later is preferably used as the cured resin component having a cardo skeleton in the cured resin layer. The method for controlling the refractive index of the cured resin layer is not limited thereto. For example, in order to increase the refractive index of the cured resin layer, it is possible that metallic oxide fine particles which have a high refractive index represented by titanium oxide and zinc oxide are used in combination with the cured resin, and added to a coating composition for forming the cured resin layer. As the material for increasing the refractive index, cured resin components containing an aromatic ring, chlorine, bromine, iodine or sulfur are effectively used, and in addition to these, a cured resin component containing a metal, such as titanium, in the molecule thereof is also effectively used.

Examples of the cured resin component having a cardo skeleton include a resin having a fluorene skeleton in the molecular structure thereof, and specifically, a crosslinkable acrylate resin represented by the following formula (b) is particularly preferred:

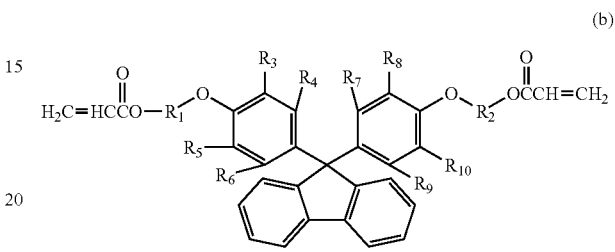

(b)

Particularly, in the case where $R_1$ and $R_2$ are all ethylene groups, and $R_3$ to $R_{10}$ are all hydrogen atoms, in the formula (b), the refractive index of the resulting cured resin layer through crosslinking reaction can be increased to around 1.63, whereby the cured resin layer can have an arbitrary refractive index by using at least two kinds of cured resin components in combination, for example, the cured resin component represented by the formula (b) and a cured resin component having a lower refractive index than the cured resin component represented by the formula (b).

Preferred examples in this case include use of a (bifunctional) acrylate resin having a fluorene skeleton and a polyfunctional urethane acrylate resin in combination as the cured resin component (for example, at a mixing ratio of from 90/10 to 50/50).

The cured resin component having a lower refractive index at 550 nm than that of the polymer film is not particularly limited, and effective examples thereof include an acrylate resin other than the acrylate represented by the formula (b), and a material containing, for example, a fluorine atom or a silicon atom and a large amount of an olefin skeleton or an alkyl group.

The cured resin component having a higher refractive index than the polymer film and the cured resin component having a lower refractive index than the polymer film are mixed at such a mixing ratio that matched to the refractive index of the polymer film as near as possible, for example, mixed to make a ratio of the cured resin component represented by the formula (b) of from 1 to 99% by mol based on the total amount. This method is preferred since in the case where the refractive indices of the two or more kinds of cured resin components to be mixed are relatively close to the refractive index of the polymer film, the target refractive index can be attained without significant deviation even though the ratio of the cured resin components to be mixed is slightly changed.

In the case where a bifunctional cured resin component, such as the formula (b), is used as the cured resin component having a high refractive index, it is preferred to use a cured resin component having at two or more, preferably three or more, polymerizable functional groups (such as an acrylate group) per one molecule, as at least one component of the other cured resin components to be mixed. However, in the case where a cured resin component having an extremely large number of polymerizable functional groups (for example, 10 or more polymerizable functional groups per one molecule) is used in combination with the cured resin component of the formula (b), there is a possibility of increasing brittleness although the cured resin layer can be improved in solvent resistance and scratch resistance by increasing the mixing ratio of the cured resin component having a large number of polymerizable functional groups. Accordingly, in the case where the cured resin component having a large number of polymerizable functional groups is used in combination, a third cured resin component having a smaller number of polymerizable functional groups per one molecule may be appropriately used in combination to prevent brittleness from being increased.

In the case where the cured resin component of the formula (b) is used as the cured resin component, in particular, a material having a high glass transition point, such as a polymer film having a glass transition point of 150° C. or more, can be used as the polymer film. In the case of the combination, the polymer film has high heat resistance, and simultaneously, the difference in refractive index between the polymer film and the cured resin layer can be decreased, whereby the transparent conductive laminated body of the invention can be suitably used in a display device demanded to have heat resistance. In particular, the transparent conductive laminated body of the invention can be suitably used as electronic paper and a liquid crystal display device, and furthermore as an organic light emitting diode.

In the invention, a latex-containing layer containing a latex or rubber material as a major component may be provided between the polymer film and the cured resin layer. By using the transparent conductive laminated body using the latex-containing layer, the transparent touch-sensitive panel is further improved in writing resistance. The thickness of the latex-containing layer is from 0.5 to 20.0 µm, preferably from 1.0 to 15 µm, and more preferably from 1.5 to 10.0 µm.

Examples of the latex or rubber material include isoprene rubber, butadiene rubber, butyl rubber, ethylene propylene rubber, chloroprene rubber, epichlorohydrin rubber, acrylic rubber, urethane rubber, silicone rubber, fluorine rubber, styrene butadiene rubber, chlorosulfonated rubber, chlorinated polyethylene rubber, nitrile rubber, acrylonitrile rubber, acrylonitrile butadiene rubber, partially hydrogenated butadiene rubber, partially hydrogenated styrene butadiene rubber, hydrogenated acrylonitrile butadiene rubber, polysulfide rubber and an acrylate ester. The latex or rubber materials may be used solely or in combination of plural kinds of them. A block copolymer of the latex or rubber materials may also be used.

The glass transition point of the latex or rubber material is preferably from −50 to 100° C. In the case where the glass transition point is less than −50° C., it is not preferred since the latex-containing layer has tackiness remaining to deteriorate workability. In the case where the glass transition point exceeds 100° C., the writing resistance of the transparent touch-sensitive panel using the transparent conductive laminated body having the latex-containing layer is not different from that of a transparent touch-sensitive panel using the transparent conductive laminated body having no latex-containing layer, and therefore, there is no significance to provide the latex-containing layer. The average molecular weight of the latex or rubber material is preferably from 50,000 to 350,000. In the case where the average molecular weight is less than 50,000, it is not preferred since the latex-containing layer has tackiness remaining to deteriorate workability. In the case where the average molecular weight exceeds 350,000, the writing resistance of the transparent touch-sensitive panel using the transparent conductive laminated body having the latex-containing layer is not different from that of a transparent touch-sensitive panel using the transparent conductive laminated body having no latex-containing layer, and therefore, there is no significance to provide the latex-containing layer.

The latex-containing layer contains the latex or rubber material as a major component, and may be mixed with other components, such as the aforementioned ionizing radiation curing resin and the aforementioned thermosetting resin.

In the case where the cured resin layer is provided between the polymer film and the metallic compound layer in the invention, it is preferred that the difference in refractive index at a wavelength of 550 nm between the metallic compound layer and the cured resin layer is less than 0.3. In the case where the difference in refractive index at a wavelength of 550 nm between the metallic compound layer and the cured resin layer is 0.3 or more, it is not preferred since coloration and decrease in transmittance occur due to reflected light at the interface between the metallic compound layer and the cured resin layer. Specifically, the cured resin layer formed of an organic material often has a refractive index in a range of from 1.5 to 1.65, and therefore, it is preferred to use such a material as the metallic material constituting the metallic compound layer that has a refractive index at a wavelength of 550 nm of about from 1.2 to 1.95. Examples of the metallic compound layer include an oxide, a nitride and an oxynitride of at least one metal selected from the group consisting of silicon, aluminum, titanium, magnesium, zinc, zirconium, indium and tin, and a mixture thereof.

In order to improve the optical characteristics of the transparent conductive laminated body, an optical interference layer may be provided between the cured resin layer and the metallic compound layer, the optical interference layer containing a transparent conductive layer and a cured resin layer having a thickness of 0.10 µm or less and a smaller refractive index at 550 nm than the cured resin layer or a pair of a low refractive index layer and a high refractive index layer with the low refractive index layer being in contact with the metallic compound layer.

Hardcoat Layer

In the case where the transparent conductive laminated body of the invention is used as a movable electrode substrate, a hardcoat layer is preferably provided on the surface, on which an external force in the transparent touch-sensitive panel is applied. Examples of the material for forming the hardcoat layer include an organosilane thermosetting resin, such as methyltriethoxysilane and phenyltriethoxysilane, a melamine thermosetting resin, such as etherified methylolmelamine, and a polyfunctional acrylate ionizing radiation curing resin, such as polyol acrylate, polyester acrylate, urethane acrylate and epoxy acrylate, and those having ultrafine particles, such as $SiO_2$ and $MgF_2$, added thereto may be used depending on necessity. The surface of the hardcoat layer may be roughened to impart antidazzle property. The thickness of the hardcoat layer is preferably from 2 to 5 µm from the standpoint of flexibility and friction resistance.

The hardcoat layer may be formed by a coating method. As the actual coating method, the aforementioned compound is dissolved in various kinds of organic solvents, followed by adjusting in concentration and viscosity, to form a coating composition, and the coating composition is coated on the polymer film to form a coated layer, which is then cured by irradiating with ionizing radiation or heating. Examples of the coating method include a microgravure coating method, a Meyer bar coating method, a direct gravure coating method, a reverse roll coating method, a curtain coating method, a spray coating method, a comma coating method, a die coating method, a knife coating method and a spin coating method.

The hardcoat layer is laminated on the polymer film directly or through a suitable anchoring layer. Preferred examples of the anchoring layer include a layer having a function of improving adhesiveness between the hardcoat layer and the polymer film, a phase retardation compensation layer, such as a layer having three-dimensional refractive index characteristics providing a negative K value, a layer having a function of preventing water or air from being permeated or a function of absorbing water or air, a layer having a function of absorbing an ultraviolet ray or an infrared ray, and a layer having a function of reducing the charging property of the substrate.

Display Device

In a display device, for example, a display device having such a constitution that two electrode substrates each having a conductive layer at least on one surface thereof are disposed to make the transparent conductive layers face each other and hold a liquid crystal layer, the transparent conductive laminated body of the invention may be used as at least one of the electrode substrates to fabricate a liquid crystal display device that is improved in flexural resistance and is capable of attaining curved display.

Transparent Touch-Sensitive Panel

In a transparent touch-sensitive panel having such a constitution that two transparent electrode substrates each having a transparent conductive layer at least on one surface thereof are disposed to make the transparent conductive layers face each other, the transparent conductive laminated body of the invention may be used as at least one of the transparent electrode substrates to fabricate a transparent touch-sensitive panel that is improved in writing resistance and edge writing resistance.

EXAMPLES

The invention will be described in more specifically with reference to examples, but the invention is not limited by the examples. The values in the examples were obtained in the following manners.

Method for Measuring Thickness of Metallic Compound Layer and Transparent Conductive Layer The metallic compound layer and the transparent conductive layer thus formed were measured for thickness thereof by using a fluorescent X-ray analyzer, RIX1000 (produced by Rigaku Corp.).

Method for Testing Flexural Resistance

The flexural resistance test was carried out in such a manner that a transparent conductive laminated body in a strip form having a width of 10 mm and a length of 160 mm was wound half around a stainless steel rod having a diameter of 6 mm with the transparent conductive layer inside, and was dangled with a weight of 100 g for 1 minute, and the number of scratches and the changed amount of resistance of the transparent conductive layer were measured for evaluation. A transparent conductive laminated body having good flexural resistance means that a ratio obtained by dividing the resistance of the transparent conductive layer after the test by the resistance of the transparent conductive layer before the test (i.e., change in resistance) is small, and the number of scratches after the test is small.

Method for Measuring Refractive Index

The refractive indices of the layers were measured with Film Tek, produced by Scientific Computing International, Inc.

Method for Measuring Surface Resistance

The surface resistance of the transparent conductive layer was measured by using Loresta-MP, produced by Mitsubishi Chemical Corp.

Method for Measuring Total Light Transmittance

The total light transmittance was measured with NDH-300A, produced by Nippon Denshoku Industries Co., Ltd.

Method for Measuring Adhesiveness

The adhesiveness was evaluated by a crosscut test according to JIS K5600-5-6. A layer laminated on the polymer film was cut with a knife into 100 pieces of squares having a dimension of 1 mm×1 mm, on which Cellotape (produced by Nichiban Co., Ltd.) was adhered. After removing the Cellotape, the number of the squares that was not removed but remained on the polymer film was counted to evaluate the adhesiveness. The evaluation 100/100 (based on classification into 0 or 1) means good adhesiveness.

Method for Measuring Linearity

A direct current voltage of 5 V was applied to parallel electrodes on a movable electrode substrate or a fixed electrode substrate of a touch-sensitive panel. The voltage was measured in a direction perpendicular to the parallel electrodes with an interval of 5 mm. The linearity was calculated by the following equation, in which EA represents the voltage at the measurement start position A, EB represents the voltage at the measurement end position B, EX represents the actually measured voltage at the position with a distance X from A, ET represents the theoretical value, and L represents the linearity.

$$ET = (EB-EA) \times X/(B-A) + EA$$

$$L(\%) = (|ET-EX|)/(EB-EA) \times 100$$

Method for Testing Edge Writing Resistance

The transparent touch-sensitive panel thus produced was written in on the side of the movable electrode substrate side at a position with a distance of about 2 mm from the surrounding insulating layer with a polyacetal pen with a tip having a radius of 0.8 R at a load of 450 g rectilinearly and reciprocally in 100,000 times (test for edge writing resistance). The linearity of the transparent touch-sensitive panel was measured before and after the test for edge writing resistance. A touch-sensitive panel that exhibit a change amount in linearity of 1.5% or more before and after the test for edge writing resistance was graded as failure.

Method for Testing Writing Resistance

The touch-sensitive panel was written in on the side of the movable electrode substrate side in the center portion with a polyacetal pen with a tip having a radius of 0.8 R at a load of 450 g rectilinearly and reciprocally in 300,000 times (the polyacetal pen with a tip having a radius of 0.8 R was replaced by 100,000 times of reciprocating) to conduct the test for writing resistance. A touch-sensitive panel that exhibit a change amount in linearity of 1.5% or more before and after the test for writing resistance was graded as failure.

Example 1

As the polymer film, Pure-Ace WR, produced by Teijin Chemicals Ltd. was used. This is referred to as a polymer film A. As the cured resin component, an acrylate monomer having a fluorene skeleton (resin B), produced by Osaka Gas Chemicals Co., Ltd. and a polyfunctional urethane acrylate monomer (resin C), produced by Shin-Nakamura Chemical Co., Ltd., were used as a mixture. As an initiator, Irgacure 184 (initiator D), produced by Ciba Specialty Chemicals, Inc., was used.

The resin B and the resin C were mixed to a solid content weight ratio of 70/30 to obtain a cured resin component E.

The cured resin component E was diluted with a mixed solvent of 1-methoxy-2-propanol (1M2P) and isopropyl alcohol (IPA) to a solid concentration of 20% by weight. The initiator D was added thereto to a solid content weight ratio of the cured resin component E and the initiator D of 100/5 to produce a coating composition. On one surface of the polymer film A having a refractive index at 550 nm of 1.65, the coating composition having been produced was coated by using a gravure coater, followed by curing through irradiation with an ultraviolet ray, to form a cured resin layer with 3.0 μm thickness. Thereafter, a heat treatment at 130° C. for 3 minutes was carried out. The refractive index at 550 nm of the cured resin layer was 1.62.

The polymer film A having the cured resin layer was placed in a chamber, which was evacuated to a back pressure of $1.3 \times 10^{-5}$ Pa, and oxygen as a reactive gas was introduced to $2.7 \times 10^{-3}$ Pa. No water was introduced, and the water partial pressure measured with a quadrupole mass spectrometer was the same as the back pressure of the chamber. Argon was then introduced as an inert gas, and the total pressure was adjusted to 0.4 Pa. An Si target was applied with electric power at an electric power density of 2 W/cm$^2$ by a reactive DC magnetron sputtering method to form an SiO$_x$ layer having a thickness of 2.5 nm as an electric compound layer on the cured resin layer. The refractive index at 550 nm of the SiO$_x$ layer was 1.48. The value x was about 1.7.

A transparent conductive layer was formed on the SiO$_x$ layer in the following manner. The chamber was evacuated to a back pressure of $1.3 \times 10^{-5}$ Pa, and oxygen as a reactive gas was introduced to $2.7 \times 10^{-3}$ Pa. No water was introduced, and a water partial pressure measured with a quadrupole mass spectrometer was the same as the back pressure of the chamber. Argon was then introduced as an inert gas, and the total pressure was adjusted to 0.4 Pa.

A sintering target of In—Zn—O containing 7.5% by weight of zinc oxide was applied with electric power at an electric power density of 2 W/cm$^2$ by a reactive DC magnetron sputtering method to form a transparent conductive layer having a thickness of 130 nm at a substrate temperature of 20° C., and thus a transparent conductive laminated body was produced.

The transparent conductive laminated body had a surface resistance of 28 Ω/sq. and a transmittance of 87%. The adhesiveness of the transparent conductive layer was as good as 100/100. As a result of the flexural resistance test, the change in resistance was 1.05, and no crack was observed after the test, which indicated good flexural resistance.

The transparent conductive laminated body was heat treated at 130° C. for 2 hours. The surface resistance became 27 Ω/sq., and the transmittance became 88%. The adhesiveness was not changed. The flexural resistance was not changed.

Example 2

A cured resin layer having a thickness of 3 μm (having a refractive index at 550 nm of 1.62) was formed on the polymer film A having a refractive index at 550 nm or 1.65 in the same manner as in Example 1. An SiO$_x$ layer having a thickness of 5 nm was formed on the cured resin layer in the same manner as in Example 1. The refractive index at 550 nm of the SiO$_x$ layer was 1.50. The value x was about 1.6.

A transparent conductive layer having a thickness of 130 nm was formed on the SiO$_x$ layer in the same manner as in Example 1 to produce a transparent conductive laminated body.

The transparent conductive laminated body had a surface resistance of 28 Ω/sq. and a transmittance of 86%. The adhesiveness of the transparent conductive layer was as good as 100/100. As a result of the flexural resistance test, the change in resistance was 1.05, and no crack was observed after the test, which indicated good flexural resistance.

The transparent conductive laminated body was heat treated at 130° C. for 2 hours. The surface resistance became 27 Ω/sq., and the transmittance became 87%. The adhesiveness was not changed. The flexural resistance was not changed.

Example 3

The resin B and the resin C were mixed at a solid content weight ratio of 70/30 to obtain a cured resin component E in the same manner as in Example 1. A dispersion liquid of silicon oxide fine particles F having an average primary particle diameter of 20 nm (produced by Fuso Chemical Co., Ltd., silicon oxide fine particle concentration: 10% by weight, dispersant: methyl ethyl ketone (MEK)) was prepared as the ultrafine particles C. A cured resin component G containing organosilane acrylate (UVICA AF#2, produced by Asai Bussan Co., Ltd.) was prepared as the organic compound containing silicon atoms. The cured resin component E, the dispersion liquid of silicon oxide fine particles F and the organic compound containing silicon atoms (cured resin component G) were mixed at a solid content weight ratio of 100/3/3, and diluted with a mixed solvent of 1-methoxy-2-propanol (1M2P) and isopropyl alcohol (IPA) to a solid concentration of 20% by weight. The initiator D was added thereto to a solid content weight ratio of the total cured resin component and the initiator D of 100/5 to produce a coating composition. On one surface of the polymer film A having a refractive index at 550 nm of 1.65, the coating composition having been produced was coated by using a gravure coater, followed by curing through irradiation with an ultraviolet ray, to form a cured resin layer with 3.0 μm thickness. Thereafter, a heat treatment at 130° C. for 3 minutes was carried out. The refractive index at 550 nm of the cured resin layer was 1.62.

An SiO$_x$ layer having a thickness of 5 nm was formed on the cured resin layer in the same manner as in Example 1. The refractive index at 550 nm of the SiO$_x$ layer was 1.50. The value x was about 1.6.

A transparent conductive layer having a thickness of 130 nm was formed on the SiO$_x$ layer in the same manner as in Example 1 to produce a transparent conductive laminated body.

The transparent conductive laminated body had a surface resistance of 28 Ω/sq. and a transmittance of 86%. The adhesiveness of the transparent conductive layer was as good as 100/100. As a result of the flexural resistance test, the change in resistance was 1.05, and no crack was observed after the test, which indicated good flexural resistance.

The transparent conductive laminated body was heat treated at 130° C. for 2 hours. The surface resistance became 27 Ω/sq., and the transmittance became 87%. The adhesiveness was not changed. The flexural resistance was not changed.

Comparative Example 1

A cured resin layer having a thickness of 3 μm (having a refractive index at 550 nm of 1.62) was formed on the polymer film A having a refractive index at 550 nm or 1.65 in the same manner as in Example 1.

A transparent conductive layer having a thickness of 130 nm was formed directly on the cured resin layer in the same manner as in Example 1 to produce a transparent conductive laminated body.

The transparent conductive laminated body had a surface resistance of 28 Ω/sq. and a transmittance of 87%. The adhesiveness of the transparent conductive layer was as good as 100/100. As a result of the flexural resistance test, the change in resistance was 1.10, and cracks were observed after the test.

The transparent conductive laminated body was heat treated at 130° C. for 2 hours. The surface resistance became 27 Ω/sq., and the transmittance was 87%. The adhesiveness was not changed. In the flexural resistance test, cracks were observed after the test.

Comparative Example 2

A cured resin layer having a thickness of 3 µm (having a refractive index at 550 nm of 1.62) was formed on the polymer film A having a refractive index at 550 nm or 1.65 in the same manner as in Example 1. An $SiO_x$ layer having a thickness of 20.0 nm was formed as the metallic compound layer on the cured resin layer in the same manner as in Example 1. The refractive index at 550 nm of the $SiO_x$ layer was 1.45. The value x was about 1.9.

A transparent conductive layer having a thickness of 130 nm was formed on the $SiO_x$ layer in the same manner as in Example 1 to produce a transparent conductive laminated body.

The transparent conductive laminated body had a surface resistance of 28 Ω/sq. and a transmittance of 88%. The adhesiveness of the transparent conductive layer was as good as 100/100. As a result of the flexural resistance test, the change in resistance was 1.10, and cracks were observed after the test.

The transparent conductive laminated body was heat treated at 130° C. for 2 hours. The surface resistance became 27 Ω/sq., and the transmittance was 88%. The adhesiveness was not changed. In the flexural resistance test, cracks were observed after the test.

Example 4

As the polymer film, a polyethylene terephthalate film having a thickness of 188 µm (OFW, produced by Teijin-DuPont Films, Inc.) was used. This is referred to as a polymer film H. A hardcoat layer having a thickness of 4 µm was formed on one surface of the polymer film H by using an ultraviolet ray curing polyfunctional acrylate resin coating composition.

A synthesis latex liquid, Nipol SX1706A, produced by Nippon Zeon Co., Ltd., was coated by a bar coating method on the surface of the polymer film H opposite to the side where the hardcoat layer had been provided, and dried at 90° C. for 2 minutes, to form a latex-containing layer having a thickness of 6.0 µm.

A cured resin component I containing 50 parts by weight of urethane acrylate, NK Oligo U-9HA, produced by Shin-Nakamura Chemical Co., Ltd., and 50 parts by weight of polyfunctional acrylate, Aronix M400, produced by Toagosei Co., Ltd. was diluted with a mixed solvent of 1-methoxy-2-propanol (1M2P) and methyl isobutyl ketone (MIBK) to a solid concentration of 20% by weight. The initiator D was added thereto to a solid content weight ratio of the cured resin component I and the initiator D of 100/5 to produce a coating composition J.

The dispersion liquid of silicon oxide fine particles F used in Example 3 and the organic compound containing silicon atoms (cured resin component G) used in Example 3 were added to the coating composition J to solid content weight ratio of the cured resin component I, the dispersion liquid of silicon oxide fine particles F and the organic compound containing silicon atoms (cured resin component G) of 100/3/3 to produce a coating composition K.

The coating composition K was coated on the latex-containing layer by a bar coating method, followed by curing through irradiation with an ultraviolet ray, to form a cured resin layer with 1.0 µm thickness.

An $SiO_x$ layer having a thickness of 2.0 nm was formed as the metallic compound layer on the cured resin layer in the same manner as in Example 1. An ITO layer having a thickness of 20 nm was formed on the $SiO_x$ layer by a sputtering method using an indium oxide-tin oxide target having a weight ratio of indium oxide and tin oxide of 97/3 and a packing density of 98% to produce a transparent conductive laminated body to be used as a movable electrode substrate. The surface resistance immediately after forming the film was about 550 Ω/sq. The movable electrode substrate was heat treated at 150° C. for 45 minutes to crystallize the ITO layer. The movable electrode substrate exhibited no change in haze before and after the heat treatment, and the surface resistance after crystallizing the ITO layer was about 450 Ω/sq.

Figure 4:
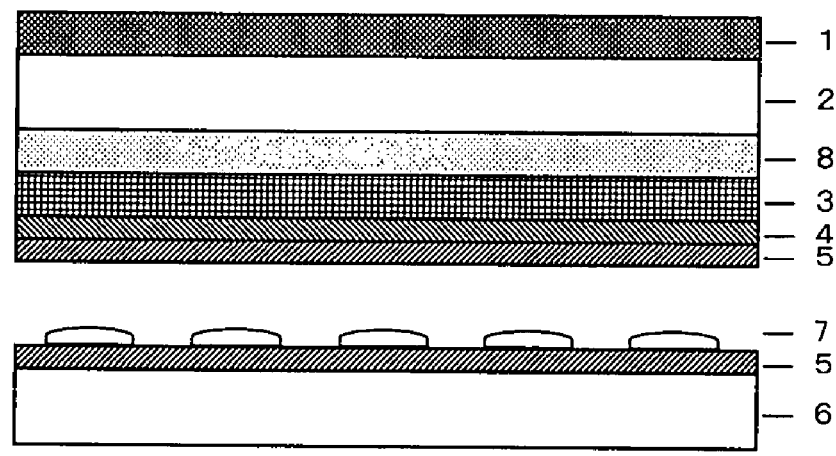
FIG. 4 is a diagram schematically showing a constitution of a touch-sensitive panel produced in Example 4.

Separately, $SiO_2$ was dip-coated on a glass plate having a thickness of 1.1 mm, on which an ITO layer having a thickness of 18 nm was formed by a sputtering method in the same manner. A dot spacer having a height of 7 µm, a diameter of 70 µm and a pitch of 1.5 mm was formed on the ITO layer to produce a fixed electrode substrate. A transparent touch-sensitive panel shown in FIG. 4 was produced by using the fixed electrode substrate and the movable electrode substrate. In FIG. 4, numeral 1 denotes the hardcoat layer, 2 denotes the polyethylene terephthalate film, 3 denotes the cured resin layer, 4 denotes the metallic compound layer, 5 denotes the transparent conductive layer, 6 denotes the glass substrate, 7 denotes the dot spacer, and 8 denotes the latex-containing layer. The transparent touch-sensitive panel was subjected to the edge writing test. The results of measurement of linearity before and after the test are shown in Table 1.

Comparative Example 3

A hardcoat layer having a thickness of 4 µm was formed on one surface of the polymer film H by using an ultraviolet ray curing polyfunctional acrylate resin coating composition in the same manner as in Example 4.

A synthesis latex liquid, Nipol SX1706A, produced by Nippon Zeon Co., Ltd., was coated on the surface of the polymer film H opposite to the side where the hardcoat layer had been provided by a bar coating method, and dried at 90° C. for 2 minutes, to form a latex-containing layer having a thickness of 6.0 µm.

A coating composition J produced in Example 4 was coated on the latex-containing layer by a bar coating method, followed by curing through irradiation with an ultraviolet ray, to form a cured resin layer with 1.0 µm thickness.

An ITO layer having a thickness of 20 nm was formed directly on the cured resin layer in the same manner as in Example 4 to produce a transparent conductive laminated body to be used as a movable electrode substrate. The surface resistance immediately after forming the film was about 550 Ω/sq. The movable electrode substrate was heat treated at 150° C. for 45 minutes to crystallize the ITO layer. The movable electrode substrate exhibited no change in haze before and after the heat treatment, and the surface resistance after crystallizing the ITO layer was about 450 Ω/sq.

Figure 5:
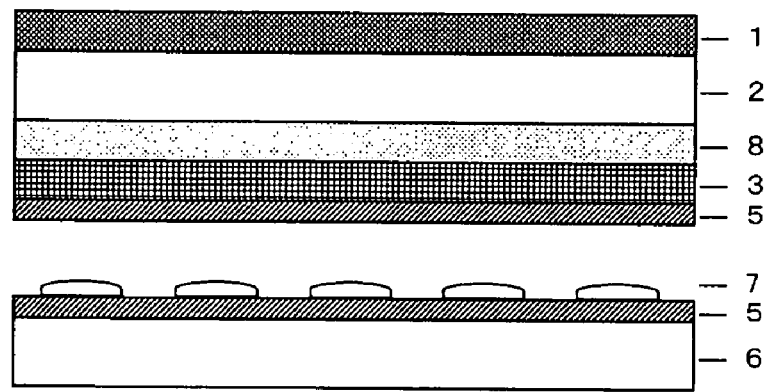
FIG. 5 is a diagram schematically showing a constitution of a touch-sensitive panel produced in Comparative Example 3.

A fixed electrode substrate was produced in the same manner as in Example 4. A transparent touch-sensitive panel shown in FIG. 5 was produced by using the fixed electrode substrate and the movable electrode substrate. In FIG. 5, numeral 1 denotes the hardcoat layer, 2 denotes the polyethylene terephthalate film, 3 denotes the cured resin layer, 5 denotes the transparent conductive layer, 6 denotes the glass substrate, 7 denotes the dot spacer, and 8 denotes the latex-containing layer. The transparent touch-sensitive panel was subjected to the edge writing test. The results of measurement of linearity before and after the test are shown in Table 1.

TABLE 1

| | Edge Writing Resistance (Linearity %) | | |
|---|---|---|---|
| | Before test | After test | Change amount |
| Example 4 | 0.56 | 0.61 | +0.05 |
| Comparative Example 3 | 0.82 | 3.38 | +2.56 |

The written position after the test of the transparent conductive laminated body of the touch-sensitive panel of Comparative Example 3 was observed with a microscope, and it was confirmed that the transparent conductive layer was partially released. It was determined that the increase in linearity after the test was ascribable to adhesion failure of the transparent conductive layer.

Example 5

A hardcoat layer having a thickness of 4 μm was formed on one surface of the polymer film H by using an ultraviolet ray curing polyfunctional acrylate resin coating composition in the same manner as in Example 4.

Bifunctional isocyanuric acid EO-modified acrylate, M215, produced by Toagosei Co., Ltd., was used as a cured resin component L. 100 parts by weight of the cured resin component L and 3 parts by weight of the initiator D were dissolved in a mixed solvent of isopropyl alcohol (IPA) and isobutyl alcohol (IBA) to produce a coating composition M.

A 10% dispersion liquid having $SiO_2$ ultrafine particles having an average primary particle diameter of 30 nm dispersed in isopropyl alcohol N (produced by C. I. Kasei Co., Ltd.) was prepared. The $SiO_2$ ultrafine particle dispersion liquid N was mixed with the coating composition M to a solid content weight ratio of the cured resin component L and the $SiO_2$ ultrafine particles of 100/10 to produce a coating composition O.

The coating composition O was coated on the surface of the polymer film H opposite to the side where the hardcoat layer had been provided by a bar coating method, and cured through irradiation with an ultraviolet ray, to form a cured resin layer having a thickness of 3.0 μm.

An $SiO_x$ layer having a thickness of 2 nm was formed as the metallic compound layer on the cured resin layer in the same manner as in Example 1. An ITO layer having a thickness of 20 nm was formed on the $SiO_x$ layer in the same manner as in Example 4 to produce a transparent conductive laminated body to be a movable electrode substrate. The surface resistance immediately after forming the film was about 550 Ω/sq. The movable electrode substrate was heat treated at 150° C. for 45 minutes to crystallize the ITO layer. The surface resistance after crystallizing the ITO layer was about 450 Ω/sq.

A fixed electrode substrate was produced in the same manner as in Example 4. A transparent touch-sensitive panel shown in FIG. 1 was produced by using the fixed electrode substrate and the movable electrode substrate.

In FIG. 1, numeral 1 denotes the hardcoat layer, 2 denotes the polyethylene terephthalate film, 3 denotes the cured resin layer, 4 denotes the metallic compound layer, 5 denotes the transparent conductive layer, 6 denotes the glass substrate, and 7 denotes the dot spacer. The transparent touch-sensitive panel was subjected to the test for writing resistance and the test for edge writing resistance. The results of measurement of linearity before and after the test are shown in Table 2.

Example 6

A hardcoat layer having a thickness of 4 μm was formed on one surface of the polymer film H by using an ultraviolet ray curing polyfunctional acrylate resin coating composition in the same manner as in Example 4.

γ-Glycidoxypropyltrimethoxysilane (KBM403, produced by Shin-Etsu Chemical Co., Ltd.) and methyltrimethoxysilane (KBM13, produced by Shin-Etsu Chemical Co., Ltd.) were mixed at a molar ratio of 1/1, and subjected to hydrolysis by using an acetic acid aqueous solution (pH 3.0) in a known manner. 1 part by weight of N-β-(aminoethyl)-γ-aminopropylmethoxy silane (KBM603, produced by Shin-Etsu Chemical Co., Ltd.) was added to 20 parts by weight in terms of solid content of the hydrolysate of silane, which were diluted with a mixed solvent of isopropyl alcohol and n-butanol to produce an alkoxysilane coating composition P.

Silica fine particles having an average primary particle diameter of 0.5 μm was added to the coating composition P in an amount of 0.3 part by weight per 100 parts by weight of alkoxysilane to produce a coating composition Q.

The coating composition Q was coated on the surface of the polymer film H opposite to the side where the hardcoat layer had been provided by a bar coating method, and baked at 130° C. for 2 minutes to form a cured resin layer having a thickness of 0.1 μm.

An $SiO_x$ layer having a thickness of 2.0 nm was formed as the metallic compound layer on the cured resin layer in the same manner as in Example 1. An ITO layer having a thickness of 20 nm was formed on the $SiO_x$ layer in the same manner as in Example 4 to produce a transparent conductive laminated body to be a movable electrode substrate. The surface resistance immediately after forming the film was about 550 Ω/sq. The movable electrode substrate was heat treated at 150° C. for 45 minutes to crystallize the ITO layer. The surface resistance after crystallizing the ITO layer was about 450 Ω/sq.

A fixed electrode substrate was produced in the same manner as in Example 4. A transparent touch-sensitive panel shown in FIG. 1 was produced by using the fixed electrode substrate and the movable electrode substrate. The transparent touch-sensitive panel was subjected to the test for writing resistance and the test for edge writing resistance. The results of measurement of linearity before and after the test are shown in Table 2.

Comparative Example 4

A hardcoat layer having a thickness of 4 μm was formed on one surface of the polymer film H by using an ultraviolet ray curing polyfunctional acrylate resin coating composition in the same manner as in Example 4.

The coating composition M produced in Example 5 was coated on the surface of the polymer film H opposite to the side where the hardcoat layer had been provided by a bar coating method, and cured through irradiation with an ultraviolet ray, to form a cured resin layer having a thickness of 3.0 μm.

An ITO layer having a thickness of 20 nm was formed directly on the cured resin layer in the same manner as in Example 4 to produce a transparent conductive laminated body to be a movable electrode substrate. The surface resistance immediately after forming the film was about 550 Ω/sq. The movable electrode substrate was heat treated at 150° C. for 45 minutes to crystallize the ITO layer. The surface resistance after crystallizing the ITO layer was about 450 Ω/sq.

Figure 2:
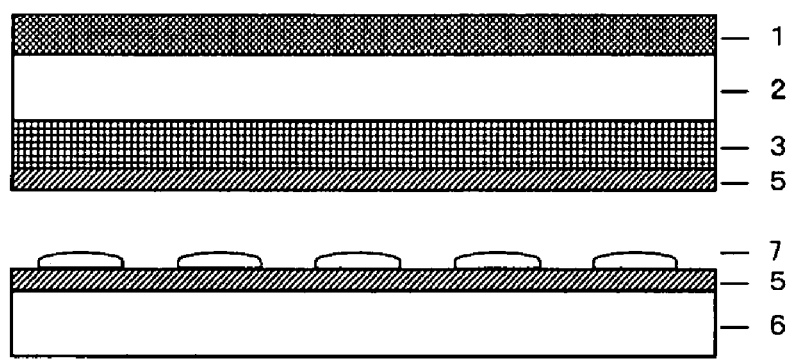
FIG. 2 is a diagram schematically showing a constitution of touch-sensitive panels produced in Comparative Examples 4 and 8.

A fixed electrode substrate was produced in the same manner as in Example 4. A transparent touch-sensitive panel shown in FIG. 2 was produced by using the fixed electrode substrate and the movable electrode substrate. In FIG. 2, numeral 1 denotes the hardcoat layer, 2 denotes the polyethylene terephthalate film, 3 denotes the cured resin layer, 5 denotes the transparent conductive layer, 6 denotes the glass substrate, and 7 denotes the dot spacer.

The transparent touch-sensitive panel was subjected to the test for writing resistance and the test for edge writing resistance. The results of measurement of linearity before and after the test are shown in Table 2.

Comparative Example 5

A hardcoat layer having a thickness of 4 μm was formed on one surface of the polymer film H by using an ultraviolet ray curing polyfunctional acrylate resin coating composition in the same manner as in Example 4.

An $SiO_x$ layer having a thickness of 20.0 nm was formed as the metallic compound layer on the surface of the polymer film H opposite to the side where the hardcoat layer had been provided in the same manner as in Example 1. An ITO layer having a thickness of 20 nm was formed on the $SiO_x$ layer in the same manner as in Example 4 to produce a transparent conductive laminated body to be a movable electrode substrate. The surface resistance immediately after forming the ITO layer was about 550 Ω/sq. The movable electrode substrate was heat treated at 150° C. for 45 minutes to crystallize the ITO layer. The surface resistance after crystallizing the ITO layer was about 450 Ω/sq.

Figure 3:
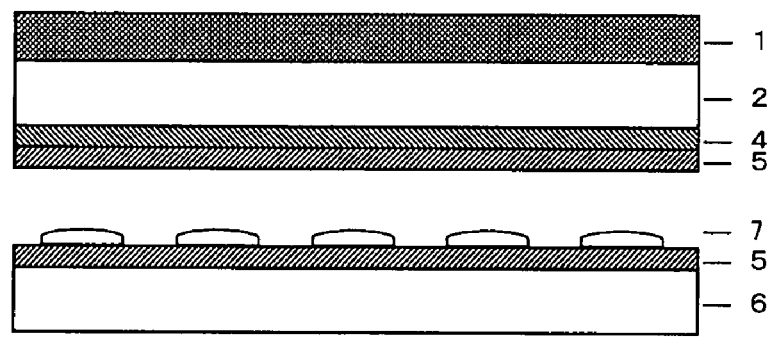
FIG. 3 is a diagram schematically showing a constitution of touch-sensitive panels produced in Comparative Example 5 and Example 7.

A fixed electrode substrate was produced in the same manner as in Example 4. A transparent touch-sensitive panel shown in FIG. 3 was produced by using the fixed electrode substrate and the movable electrode substrate. In FIG. 3, numeral 1 denotes the hardcoat layer, 2 denotes the polyethylene terephthalate film, 4 denotes the metallic compound layer, 5 denotes the transparent conductive layer, 6 denotes the glass substrate, and 7 denotes the dot spacer. The transparent touch-sensitive panel was subjected to the test for writing resistance and the test for edge writing resistance. The results of measurement of linearity before and after the test are shown in Table 2.

Comparative Example 6

A hardcoat layer having a thickness of 4 μm was formed on one surface of the polymer film H by using an ultraviolet ray curing polyfunctional acrylate resin coating composition in the same manner as in Example 4.

The coating composition M produced in Example 5 was coated on the surface of the polymer film H opposite to the side where the hardcoat layer had been provided by a bar coating method, and cured through irradiation with an ultraviolet ray, to form a cured resin layer having a thickness of 3.0 μm.

An $SiO_x$ layer having a thickness of 20.0 nm was formed as the metallic compound layer on the cured resin layer in the same manner as in Example 1. An ITO layer having a thickness of 20 nm was formed on the $SiO_x$ layer in the same manner as in Example 4 to produce a transparent conductive laminated body to be a movable electrode substrate. The surface resistance immediately after forming the film was about 550 Ω/sq. The movable electrode substrate was heat treated at 150° C. for 45 minutes to crystallize the ITO layer. The surface resistance after crystallizing the ITO layer was about 450 Ω/sq.

A fixed electrode substrate was produced in the same manner as in Example 4. A transparent touch-sensitive panel shown in FIG. 1 was produced by using the fixed electrode substrate and the movable electrode substrate. The transparent touch-sensitive panel was subjected to the test for writing resistance and the test for edge writing resistance. The results of measurement of linearity before and after the test are shown in Table 2.

Comparative Example 7

A hardcoat layer having a thickness of 4 μm was formed on one surface of the polymer film H by using an ultraviolet ray curing polyfunctional acrylate resin coating composition in the same manner as in Example 4.

The coating composition O produced in Example 5 was coated on the surface of the polymer film H opposite to the side where the hardcoat layer had been provided by a bar coating method, and cured through irradiation with an ultraviolet ray, to form a cured resin layer having a thickness of 3.0 μm.

An $SiO_x$ layer having a thickness of 20.0 nm was formed as the metallic compound layer on the cured resin layer in the same manner as in Example 1. An ITO layer having a thickness of 20 nm was formed on the $SiO_x$ layer in the same manner as in Example 4 to produce a transparent conductive laminated body to be a movable electrode substrate. The surface resistance immediately after forming the film was about 550 Ω/sq. The movable electrode substrate was heat treated at 150° C. for 45 minutes to crystallize the ITO layer. The surface resistance after crystallizing the ITO layer was about 450 Ω/sq.

A fixed electrode substrate was produced in the same manner as in Example 4. A transparent touch-sensitive panel shown in FIG. 1 was produced by using the fixed electrode substrate and the movable electrode substrate. The transparent touch-sensitive panel was subjected to the test for writing resistance and the test for edge writing resistance. The results of measurement of linearity before and after the test are shown in Table 2.

Comparative Example 8

A hardcoat layer having a thickness of 4 μm was formed on one surface of the polymer film H by using an ultraviolet ray curing polyfunctional acrylate resin coating composition in the same manner as in Example 4.

The coating composition C produced in Example 5 was coated on the surface of the polymer film H opposite to the side where the hardcoat layer had been provided by a bar coating method, and cured through irradiation with an ultraviolet ray, to form a cured resin layer having a thickness of 3.0 μm.

An ITO layer having a thickness of 20 nm was formed directly on the cured resin layer in the same manner as in Example 4 to produce a transparent conductive laminated body to be a movable electrode substrate. The surface resistance immediately after forming the film was about 550 Ω/sq.

The movable electrode substrate was heat treated at 150° C. for 45 minutes to crystallize the ITO layer. The surface resistance after crystallizing the ITO layer was about 450 Ω/sq.

A fixed electrode substrate was produced in the same manner as in Example 4. A transparent touch-sensitive panel shown in FIG. 2 was produced by using the fixed electrode substrate and the movable electrode substrate. The transparent touch-sensitive panel was subjected to the test for writing resistance and the test for edge writing resistance. The results of measurement of linearity before and after the test are shown in Table 2.

TABLE 2

|  | Metallic atom commonly contained in cured resin layer and metallic compound layer | Thickness of metallic compound layer (nm) | Writing resistance (linearity %) | | | Edge writing resistance (linearity %) | | |
|---|---|---|---|---|---|---|---|---|
|  |  |  | Before test | After test | Change amount | Before test | After test | Change amount |
| Example 5 | Si | 2.0 | 0.77 | 0.91 | +0.14 | 0.61 | 0.86 | +0.25 |
| Example 6 | Si | 2.0 | 0.82 | 0.90 | +0.08 | 0.94 | 1.05 | +0.11 |
| Comparative Example 4 | no metallic atom in cured resin layer, without metallic compound layer | — | 0.65 | 1.71 | +1.06 | 0.54 | 2.15 | +1.61 |
| Comparative Example 5 | no cured resin layer, with metallic compound layer | 20.0 | 0.73 | 1.28 | +0.55 | 0.59 | 2.28 | +1.69 |
| Comparative Example 6 | no metallic atom in cured resin layer, with metallic compound layer | 20.0 | 0.51 | 0.99 | +0.48 | 0.77 | 3.11 | +2.34 |
| Comparative Example 7 | Si, with metallic compound layer | 20.0 | 0.63 | 0.74 | +0.09 | 0.41 | 1.98 | +1.57 |
| Comparative Example 8 | Si, without metallic compound layer | — | 0.34 | 1.01 | +0.67 | 0.54 | 3.92 | +3.38 |

Example 7

A hardcoat layer having a thickness of 4 μm was formed on one surface of the polymer film H by using an ultraviolet ray curing polyfunctional acrylate resin coating composition in the same manner as in Example 4.

An $SiO_x$ layer having a thickness of 2.0 nm was formed as the metallic compound layer on the surface of the polymer film H opposite to the side where the hardcoat layer had been provided in the same manner as in Example 1. An ITO layer having a thickness of 20 nm was formed on the $SiO_x$ layer in the same manner as in Example 4 to produce a transparent conductive laminated body to be a movable electrode substrate. The surface resistance immediately after forming the film was about 550 Ω/sq. The movable electrode substrate was heat treated at 150° C. for 45 minutes to crystallize the ITO layer. The surface resistance after crystallizing the ITO layer was about 450 Ω/sq.

A fixed electrode substrate was produced in the same manner as in Example 4. A transparent touch-sensitive panel shown in FIG. 3 was produced by using the fixed electrode substrate and the movable electrode substrate. The transparent touch-sensitive panel was subjected to the test for writing resistance and the test for edge writing resistance. The results of measurement of linearity before and after the test are shown in Table 3.

TABLE 3

|  | Thickness of metallic compound layer (nm) | Writing resistance (linearity %) | | | Edge writing resistance (linearity %) | | |
|---|---|---|---|---|---|---|---|
|  |  | Before test | After test | Change amount | Before test | After test | Change amount |
| Example 7 | 2.0 | 0.34 | 0.36 | +0.02 | 0.29 | 0.30 | +0.01 |

The invention claimed is:

1. A transparent conductive laminated body (1) comprising a polymer film having a metallic compound layer and a transparent conductive layer laminated sequentially on at least one surface thereof, (2) the metallic compound layer being in contact with the transparent conductive layer, (3) the metallic compound layer having a thickness of 0.5 nm or more and less than 5.0 nm and not exhibiting a mechanical property as a continuous body.

2. The transparent conductive laminated body as claimed in claim 1, wherein a thickness of the metallic compound layer is smaller than a thickness of the transparent conductive layer.

3. The transparent conductive laminated body as claimed in claim 1, wherein the metallic compound layer comprises an oxide, a nitride or an oxynitride of at least one metal selected from the group consisting of silicon, aluminum, titanium, magnesium, zinc, zirconium, indium and tin, or a mixture thereof.

4. The transparent conductive laminated body as claimed in claim 1, wherein the transparent conductive laminated body further comprises a cured resin layer between the polymer film and the metallic compound layer.

5. The transparent conductive laminated body as claimed in claim 1, wherein the cured resin layer contains the same metallic atoms as the metallic compound layer.

6. The transparent conductive laminated body as claimed in claim 4, wherein the cured resin layer contains ultrafine particles having an average primary particle diameter of 100 nm or less comprising a metallic oxide or a metallic fluoride, and an organic compound containing silicon atoms.

7. The transparent conductive laminated body as claimed in claim 6, wherein the ultrafine particles are segregated at a surface of the cured resin layer.

8. The transparent conductive laminated body as claimed in claim 6, wherein the ultrafine particles are silicon oxide ultrafine particles.

9. The transparent conductive laminated body as claimed in claim 4, wherein a difference in refractive index at a wavelength of 550 nm between the cured resin layer and the polymer film is less than 0.05, and a difference in refractive index at a wavelength of 550 nm between the cured resin layer and the metallic compound layer is less than 0.3.

10. The transparent conductive laminated body as claimed in claim 4, wherein the cured resin layer comprises a cured product of a cured resin component comprising a polyfunctional acrylate resin and an acrylate resin having a cardo skeleton.

11. The transparent conductive laminated body as claimed in claim 1, wherein the transparent conductive layer has a thickness of from 5.0 to 50.0 nm.

12. The transparent conductive laminated body as claimed in claim 1, wherein the transparent conductive layer comprises a crystalline material containing indium oxide as a major component.

13. The transparent conductive laminated body as claimed in claim 1, wherein the polymer film has a glass transition point of 150° C. or more.

14. A display device comprising the transparent conductive laminated body as claimed in claim 1 as a substrate.

15. A transparent touch-sensitive panel comprising two transparent electrode substrates each having a conductive layer at least on one surface thereof disposed to make the transparent conductive layers face each other, at least one of the transparent electrode substrates being the transparent conductive laminated body claimed in claim 1.

* * * * *